US008076881B1

(12) United States Patent
Hall et al.

(10) Patent No.: US 8,076,881 B1
(45) Date of Patent: Dec. 13, 2011

(54) SYSTEM AND METHOD FOR CONTROLLING AN ELECTRIC MOTOR

(75) Inventors: David J. Hall, Pittsburgh, PA (US); Mark P. Krefta, Murrysville, PA (US)

(73) Assignee: Curtiss-Wright Electro-Mechanical Corp., Chewick, PA (US)

( * ) Notice: Subject to any disclaimer, the term of this patent is extended or adjusted under 35 U.S.C. 154(b) by 365 days.

(21) Appl. No.: 12/485,788

(22) Filed: Jun. 16, 2009

(51) Int. Cl.
*H02P 31/00* (2006.01)
*H02P 1/46* (2006.01)

(52) U.S. Cl. .......... 318/400.2; 318/400.32; 318/400.33; 318/701; 318/802

(58) Field of Classification Search ............. 318/400.17, 318/400.02, 400.32, 400.33, 701, 717, 720, 318/798, 800, 802; 363/34
See application file for complete search history.

(56) References Cited

U.S. PATENT DOCUMENTS

| | | | |
|---|---|---|---|
| 3,824,437 A | | 7/1974 | Blaschke |
| 4,814,677 A | * | 3/1989 | Plunkett .................. 318/400.02 |
| 5,003,243 A | * | 3/1991 | Tadakuma et al. ............ 318/800 |
| 5,194,797 A | | 3/1993 | Kahkipuro |
| 5,652,485 A | * | 7/1997 | Spiegel et al. ................. 318/147 |
| 6,057,622 A | | 5/2000 | Hsu |
| 6,339,308 B2 | * | 1/2002 | Shinnaka ...................... 318/701 |
| 2001/0024100 A1 | * | 9/2001 | Shinnaka ...................... 318/701 |

* cited by examiner

*Primary Examiner* — Paul Ip
(74) *Attorney, Agent, or Firm* — Reed Smith LLP

(57) ABSTRACT

A system. The system includes a first module, a second module communicably connected to the first module, a third module communicably connected to the first module, and a fourth module communicably connected to the third module. The first module is configured for determining an angle. The angle is defined by a first rotating reference frame having an axis aligned with a permanent magnet flux of a permanent magnet motor, and a vector of a motor magnetizing flux of the permanent magnet motor. The second module is configured for defining a second rotating reference frame having an axis aligned with the vector, and for transforming a two-phase set of direct currents from the first rotating reference frame to the second rotating reference frame. The first and second rotating reference frames are synchronized. The third module is configured for generating a first direct current reference signal associated with the second rotating reference frame. The fourth module is configured for generating a second direct current reference signal associated with the second rotating reference frame. The first and second desired direct current reference signals are orthogonal.

20 Claims, 11 Drawing Sheets

$\lambda_{md} = \lambda_{pm} + L_{md}i_{ds}$ $\lambda'_{mq} = L_{mq}i_{qs}\cos(\varphi) - (\lambda_{Pm} + L_{md}i_{ds})\sin(\varphi) = 0$ $\lambda'_{md} = (\lambda_{Pm} + L_{md}i_{ds})\cos(\varphi) + L_{mq}i_{qs}\sin(\varphi) = |\lambda_m|$

SYSTEM AND METHOD FOR CONTROLLING AN ELECTRIC MOTOR

This invention was made with United States Government support in the form of Contract No. N00014-08-C-0180 with the Office of Naval Research. The United States Government may have certain rights in the invention.

BACKGROUND

This application discloses an invention which is related, generally and in various embodiments, to a system and method for controlling an electric motor.

FIG. 1 illustrates a high level representation of an electric propulsion drive system 10. The system 10 includes a variable frequency motor drive 12, an electric motor 14, and a vector control system 16. In general, the vector control system 16 may be implemented at least in part by a computing device (e.g., a vector or field oriented controller). As shown in FIG. 1, the variable frequency motor drive 12 is electrically connected to a constant frequency AC source 18, and the electric motor 14 is electrically connected to the variable frequency motor drive 12. The electric motor 12 is mechanically connected to a shaft 20, and the shaft 20 is also mechanically connected to a propeller 22. For purposes of simplicity, the system 10 will be described in the context of a three-phase system.

In operation, the constant frequency AC source 18 applies a three-phase fixed frequency AC voltage to the variable frequency motor drive 12. The variable frequency motor drive 12 draws a three-phase fixed frequency alternating current then applies a three-phase variable frequency AC voltage to the electric motor 14. The electric motor 14 draws a three-phase variable frequency alternating current which causes a portion of the electric motor 12 to rotate, thereby causing the shaft 20 and the propeller 22 to rotate. The rotation of the propeller 22 operates to propel a vessel in a given direction.

To provide control of the torque applied to the shaft 20 and the speed of the shaft 20, at least two of the individual phase currents drawn by the electric motor 14 are sensed or measured then provided as inputs to the vector control system 16. The rotational speed and angle of the shaft 20 are also sensed or measured, then provided as additional inputs to the vector control system 16. Based on the sensed or measured phase currents drawn by the electric motor 14 and the sensed or measured rotational speed and angle of the shaft 20, the vector control system 16 generates three AC phase voltage reference signals that are provided as inputs to the variable frequency motor drive 12. Based on the generated AC phase voltage reference signals provided as inputs to the variable frequency motor drive 12 by the vector control system 16, the variable frequency motor drive 12 adjusts the three-phase variable frequency AC voltage applied to the electric motor 14 so that the desired torque and shaft speed are realized.

FIG. 2 illustrates a simplified 2-pole representation of a permanent magnet synchronous motor. In a typical Field Oriented Vector (FOV) control system for a permanent magnet motor, the stator current and stator voltages are transformed to a rotating reference frame (e.g., DQ reference frame) which is synchronized with the permanent magnet flux of the rotor as shown in FIG. 2. The direct axis (d-axis) is oriented with the permanent magnet flux and the quadrature axis (q-axis) is 90 degrees out of phase from the direct axis. In this rotating reference frame, it has been well established that the motor torque is given by the following equation:

$$T = \frac{3}{2}\frac{\text{poles}}{2}(\lambda_{ds}i_{qs} - \lambda_{qs}i_{ds}), \quad (1)$$

or alternately, by the following equation:

$$T = \frac{3}{2}\frac{\text{poles}}{2}[\lambda_{pm}i_{qs} + (L_{md} - L_{mq})i_{qs}i_{ds}] \quad (2)$$

where T is the motor electromagnetic torque, poles are the number of motor poles, $\lambda_{ds}$ is the stator d-axis flux linkages, $i_{qs}$ is the stator q-axis current, $\lambda_{qs}$ is the stator q-axis flux linkages, $i_{ds}$ is the stator d-axis current, $\lambda_{pm}$ is the rotor permanent magnet flux linkages, $L_{md}$ is the d-axis magnetizing inductance, and $L_{mq}$ is the q-axis magnetizing inductance. The stator d-axis and q-axis flux linkages are given by the following equations:

$$\lambda_{ds} = \lambda_{pm} + (L_{ls} + L_{md})i_{ds} \quad (3)$$

and $$\lambda_{qs} = (L_{ls} + L_{mq})i_{qs} \quad (4)$$

where $\lambda_{pm}$ is the permanent magnet flux, $L_{ls}$ is the leakage inductance of the electric motor, and the other quantities are as indicated above.

It should be noted that FIG. 2 illustrates the specific case of positive d-axis stator current ($i_{ds}>0$), where the d-axis flux linkage from the permanent magnet or field coil is increased by the stator d-axis current. For purposes of simplicity, this is the convention utilized herein for the motor fluxes and currents. However, there is nothing to limit the stator d-axis current to positive values or to prevent the stator d-axis current from being negative and opposing (or bucking) the rotor flux. Negative d-axis current is a common mode of operation at high speed and torque loading since the stator winding flux linkage and motor voltage often become excessive without any additional flux reduction or "field weakening". The flux reduction is generally achieved by driving the d-axis current negative, thereby reducing the overall d-axis flux linkage. The reduced d-axis flux linkage, in turn, decreases the total stator winding flux linkage and consequently the motor terminal voltage.

The typical goal of the vector control system 16 is to align the rotating reference frame associated with the transformation to direct and quadrature axes so that the direct axis coincides with the positive rotor flux and the quadrature axis is rotated from the direct axis by 90 degrees in the counter clockwise direction. Since all the rotor flux is directed down the d-axis, the quadrature axis flux generated by the rotor is zero. Torque control can then be obtained by keeping the direct axis flux ($\lambda_{ds}$) nearly constant and operating only on the quadrature axis current ($i_{qs}$). The direct axis flux is provided primarily by the permanent magnets on the rotor, but can be adjusted with $i_{ds}$ to maintain motor terminal voltage within allowable limits for a variety of load conditions.

FIG. 3 illustrates a more detailed representation of the electric propulsion drive system 10 of FIG. 1. As shown in FIG. 3, the vector control system 16 receives the following signals as inputs: a shaft angle signal, a shaft speed signal, and at least two motor phase currents. The shaft angle is used in the transformation from phase variables to the rotating DQ reference frame. If the q-axis flux is assumed to be small, the torque is primarily controlled by adjusting the stator q-axis current, $i_{qs}$.

The vector control system 16 in FIG. 3 assumes that the motor flux is aligned with the permanent magnet flux along the d-axis as shown in FIG. 2. In this case, the motor flux depends only on the permanent magnet flux $\lambda_{pm}$ and $i_{ds}$. However, this is only the case when the torque is zero. At torque values other than zero, the motor flux depends on both the d-axis and q-axis stator currents, and is shifted from the d-axis as shown in FIG. 4. For cases when the torque values are other than zero, the magnitude of the motor magnetizing flux is given by the following equation:

$$|\lambda_m| = \sqrt{\lambda_{md}^2 + \lambda_{mq}^2} \quad (5)$$

where $\lambda_{md} = \lambda_{pm} + L_{md} i_{ds}$ and $\lambda_{mq} = L_{mq} i_{qs}$.

Thus, for the vector control system 16 of FIG. 3, the flux linkage is dependent on both the d-axis and q-axis current components. Further, the torque is also dependent on both the d-axis and q-axis currents if a reluctance torque component (i.e., $L_{md} \neq L_{mq}$) is present.

SUMMARY

In one general respect, this application discloses a system. According to various embodiments, the system includes a first module, a second module communicably connected to the first module, a third module communicably connected to the first module, and a fourth module communicably connected to the third module. The first module is configured for determining an angle. The angle is defined by a first rotating reference frame having an axis aligned with a permanent magnet flux of a permanent magnet motor, and a vector of a motor magnetizing flux of the permanent magnet motor. The second module is configured for defining a second rotating reference frame having an axis aligned with the vector, and for transforming a two-phase set of direct currents from the first rotating reference frame to the second rotating reference frame. The first and second rotating reference frames are synchronized. The third module is configured for generating a first direct current reference signal associated with the second rotating reference frame. The fourth module is configured for generating a second direct current reference signal associated with the second rotating reference frame. The first and second direct current reference signals are orthogonal.

In another general respect, this application discloses a method. The method is implemented at least in part by a computing device. According to various embodiments, the method includes determining an angle between a first axis of a first rotating reference frame and a vector of a motor magnetizing flux of an electric motor, and defining a second rotating reference frame based on the angle. The second rotating reference frame is synchronized with the first rotating reference frame. The method also includes transforming a two-phase set of direct currents from the first rotating reference frame to the second rotating reference frame, generating a first direct current reference signal for independently controlling torque applied by the electric motor, and generating a second direct current reference signal for independently controlling flux associated with the electric motor. The desired first and second direct current reference signals are orthogonal in the second rotating reference frame.

BRIEF DESCRIPTION OF THE DRAWINGS

Various embodiments of the invention are described herein in by way of example in conjunction with the following figures, wherein like reference characters designate the same or similar elements.

DETAILED DESCRIPTION

It is to be understood that at least some of the figures and descriptions of the invention have been simplified to illustrate elements that are relevant for a clear understanding of the invention, while eliminating, for purposes of clarity, other elements that those of ordinary skill in the art will appreciate may also comprise a portion of the invention. However, because such elements are well known in the art, and because they do not facilitate a better understanding of the invention, a description of such elements is not provided herein.

Figure 5:
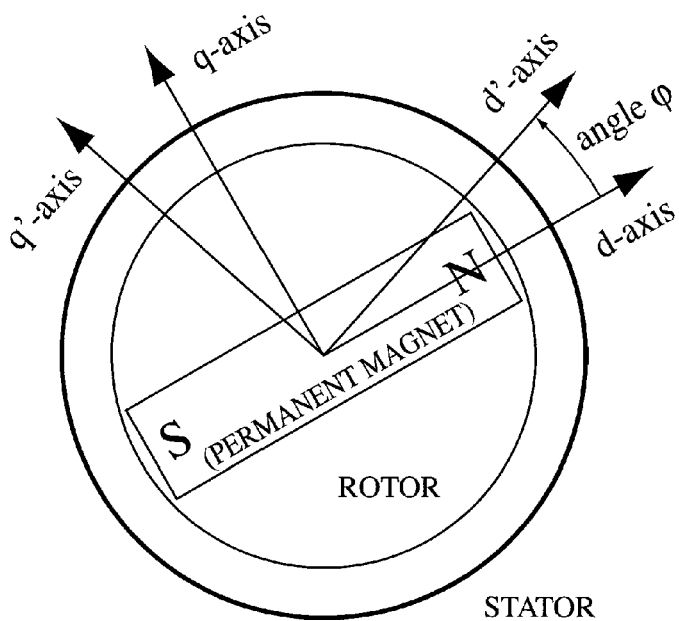
FIG. 5 illustrates a simplified 2-pole representation of a permanent magnet synchronous motor.

FIG. 5 illustrates a simplified 2-pole representation of a permanent magnet synchronous motor. For cases when the torque values are other than zero, the motor flux is shifted from the d-axis by an angle $\phi$. The DQ rotating reference frame be can be shifted by the angle $\phi$ to align a new d'-axis with the magnitude of the electric motor flux so that the flux along the q'-axis is zero. In the new D'Q' rotating reference frame, which is synchronized with the DQ rotating reference frame, torque control can be accomplished independently by varying the stator q'-axis current while flux control can be accomplished solely varying the stator d'-axis current. Thus, by utilizing the D'Q' rotating reference frame, the torque and flux controls are decoupled.

Once the desired torque and flux linkage levels have been established, it will be appreciated that the stator current components may then be evaluated using independent scalar relationships. As described in more detail hereinbelow, the decoupling allows for a straight-forward approach to generating the instantaneous desired motor currents that will in turn drive the motor shaft 20 to the desired speed or position within allowable voltage limits.

Figure 6:
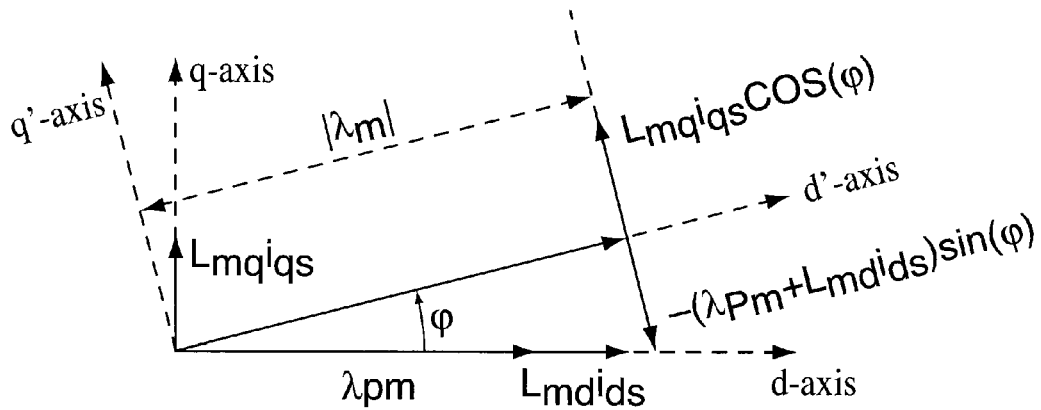
FIG. 6 illustrates a motor flux vector diagram and associated mathematical projections.

FIG. 6 illustrates a motor flux vector diagram and associated mathematical projections. Both the DQ and D'Q' rotating reference frames are shown, and the permanent magnet flux is still along the d-axis. Setting the q'-axis magnetizing flux linkage to zero yields the following equations:

$$\lambda'_{mq} = L_{mq} i_{qs} \cos(\phi) - (\lambda_{pm} + L_{md} i_{ds}) \sin(\phi) = 0 \quad (6)$$

and $$\lambda'_{md} = (\lambda_{pm} + L_{md} i_{ds}) \cos(\phi) + L_{mq} i_{qs} \sin(\phi) = |\lambda_m| \quad (7)$$

where the angle φ is as shown in FIGS. 5 and 6. Since $\lambda'_{mq} = 0$, the following equation can be utilized to solve equation (6) for the angle φ:

$$\varphi = \tan^{-1}\left(\frac{L_{mq} i_{qs}}{\lambda_{pm} + L_{md} i_{ds}}\right) \quad (8)$$

The angle φ can be used to define a second coordinate transformation from the DQ reference frame to the D'Q' reference frame. Once in the D'Q' reference frame with $\lambda'_{mq} = 0$, torque control can then be obtained by keeping the d'-axis axis magnetizing flux ($\lambda'_{md}$) nearly constant and operating only on the q'-axis current ($i'_{qs}$) via the following equation:

$$i'_{qs-reference} = \frac{2}{3} \frac{2}{\text{poles}} \frac{T_{reference}}{\lambda'_{md-reference}} \quad (9)$$

where $T_{reference}$ is the desired motor torque and $\lambda'_{md-reference}$ is the desired d'-axis flux linkage. Since $\lambda'_{mq} = 0$, $\lambda'_{md-reference}$ is equal to the magnitude of the desired magnetizing flux linkages in the motor: $|\lambda_m|_{reference}$.

The d'-axis reference current can be calculated from the equation for $\lambda'_{md}$ above. However, since the equation is in terms of $i_{ds}$ and $i_{qs}$, the following relationships for rotation of Cartesian coordinates through angle φ [6] may be utilized:

$$i_{ds} = i'_{ds} \cos(\phi) - i'_{qs} \sin(\phi) \quad (10)$$

and $$i_{qs} = i'_{ds} \sin(\phi) + i'_{qs} \cos(\phi). \quad (11)$$

Substituting equations (10) and (11) into equation (7) for $\lambda'_{md}$ yields the following equation:

$$\lambda'_{md} = \lambda_{pm} \cos(\varphi) + L_{md}(i'_{ds} \cos(\varphi) - i'_{qs} \sin(\varphi)) \cos(\varphi) + \quad (12)$$
$$L_{mq}(i'_{ds} \sin(\varphi) + i'_{qs} \cos(\varphi)) \sin(\varphi) = |\lambda_m|$$

Combining terms in equation (12) and rearranging to solve for reference quantity $i'_{ds} = i'_{ds-reference}$, yields the following equation:

$$i'_{ds-reference} = \frac{\lambda'_{md-refernce} - \lambda_{pm} \cos(\varphi) - i'_{qs-refernce}(L_{md} - L_{mq}) \cos(\varphi) \sin(\varphi)}{L_{md} \cos^2(\varphi) + L_{mq} \sin^2(\varphi)} \quad (13)$$

where $\lambda'_{md-reference}$ is equal to the magnitude of the desired magnetizing flux linkages in the motor: $|\lambda_m|_{reference}$. For the special case of a symmetric round rotor machine where $L_{md} = L_{mq} = L_m$, equation (13) reduces to the following equation:

$$i'_{ds-reference} = \frac{\lambda'_{md-reference} - \lambda_{pm} \cos(\varphi)}{L_m} \quad (14)$$

Thus, in view of the foregoing, it will be appreciated that the values of φ, $i'_{qs-reference}$, and $i'_{ds-reference}$ can be calculated from all known quantities using the equations (8), (9), and (13) or (14) respectively, thereby simplifying the computations typically required for controlling the torque of the motor and for actively controlling the net air gap magnetic flux and machine voltage level.

Figure 1:
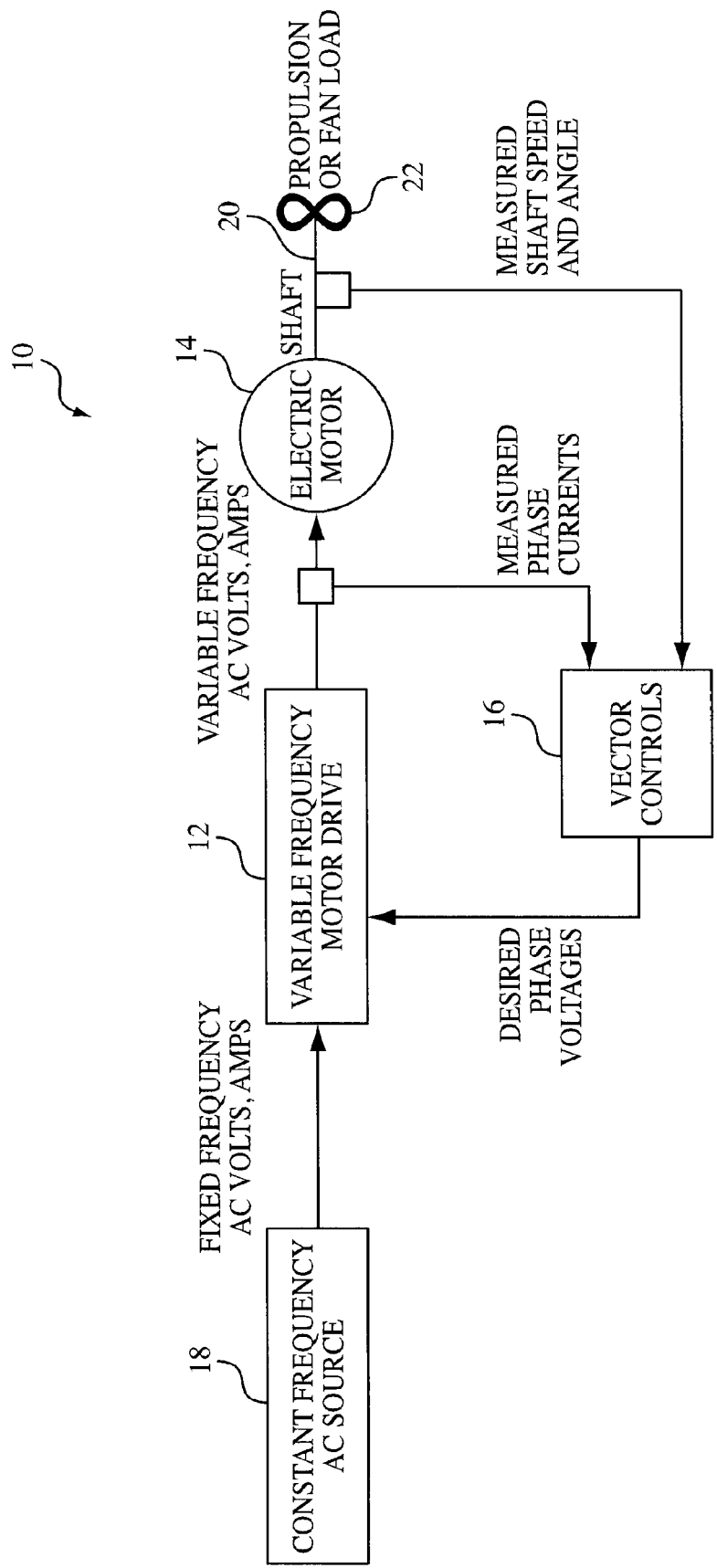
FIG. 1 illustrates a high level representation of an electric propulsion drive system.
Figure 2:
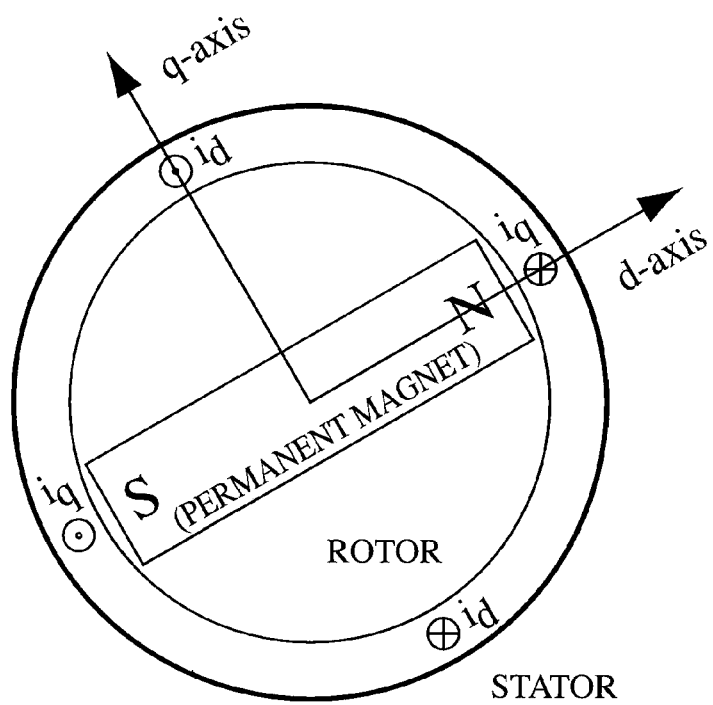
FIG. 2 illustrates a simplified 2-pole representation of a permanent magnet synchronous motor.
Figure 4:
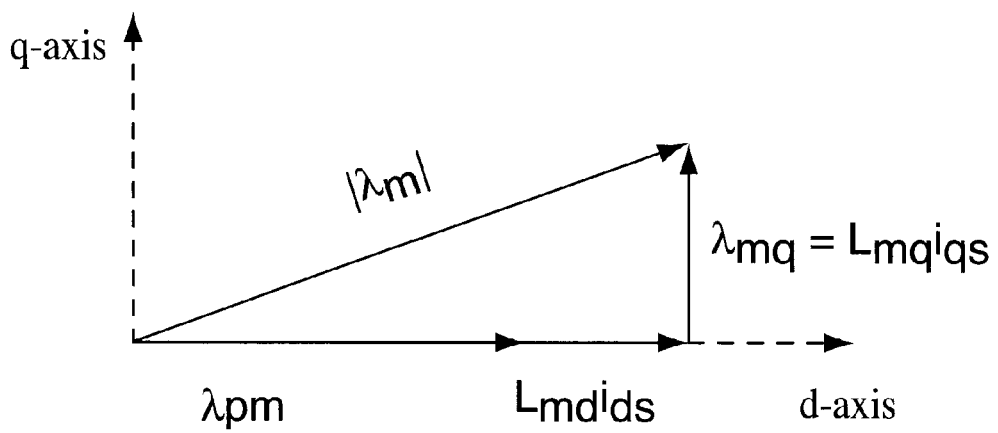
FIG. 4 illustrates a motor flux vector diagram.
Figure 3:
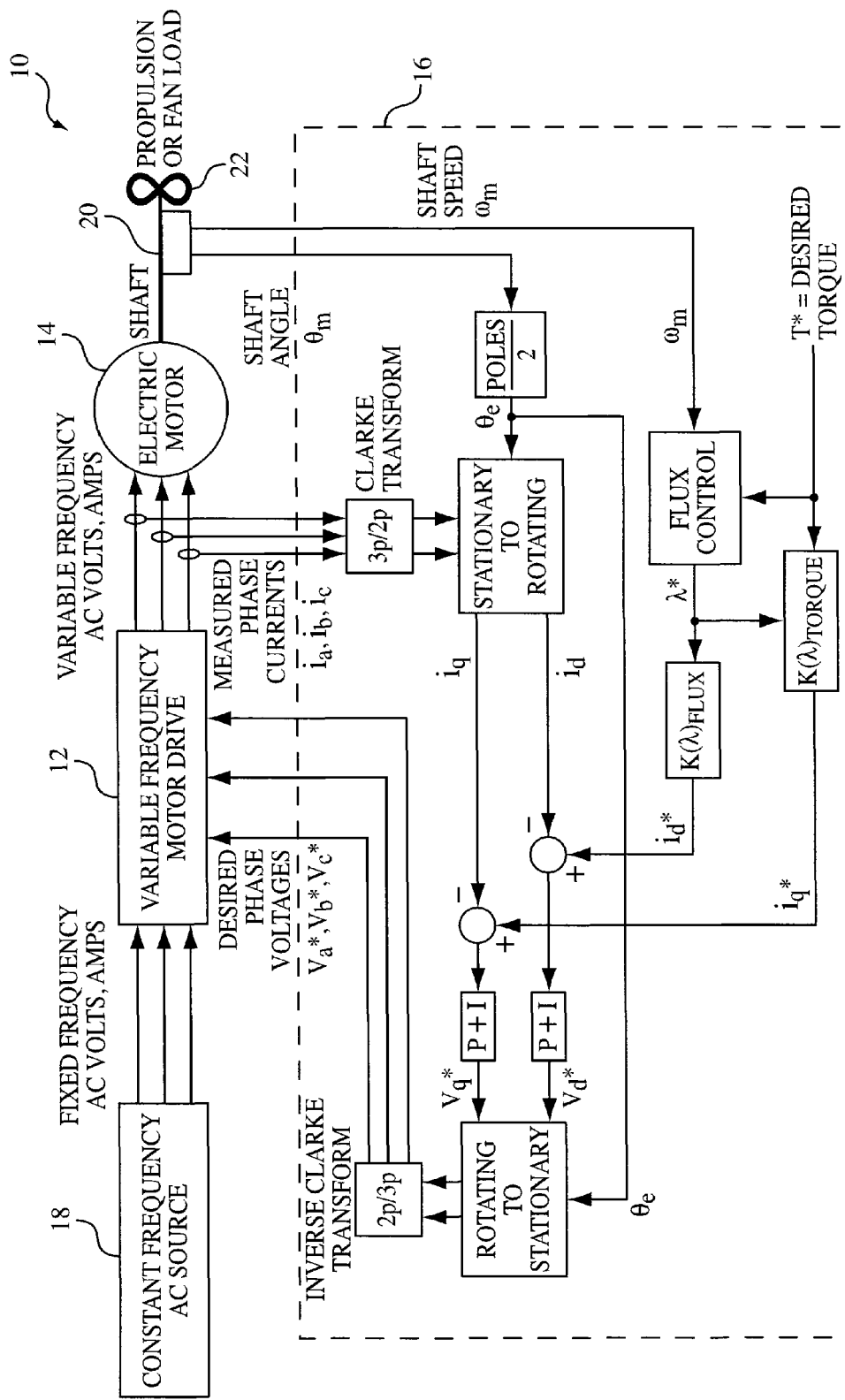
FIG. 3 illustrates a more detailed representation of the electric propulsion drive system of FIG. 1.
Figure 7:
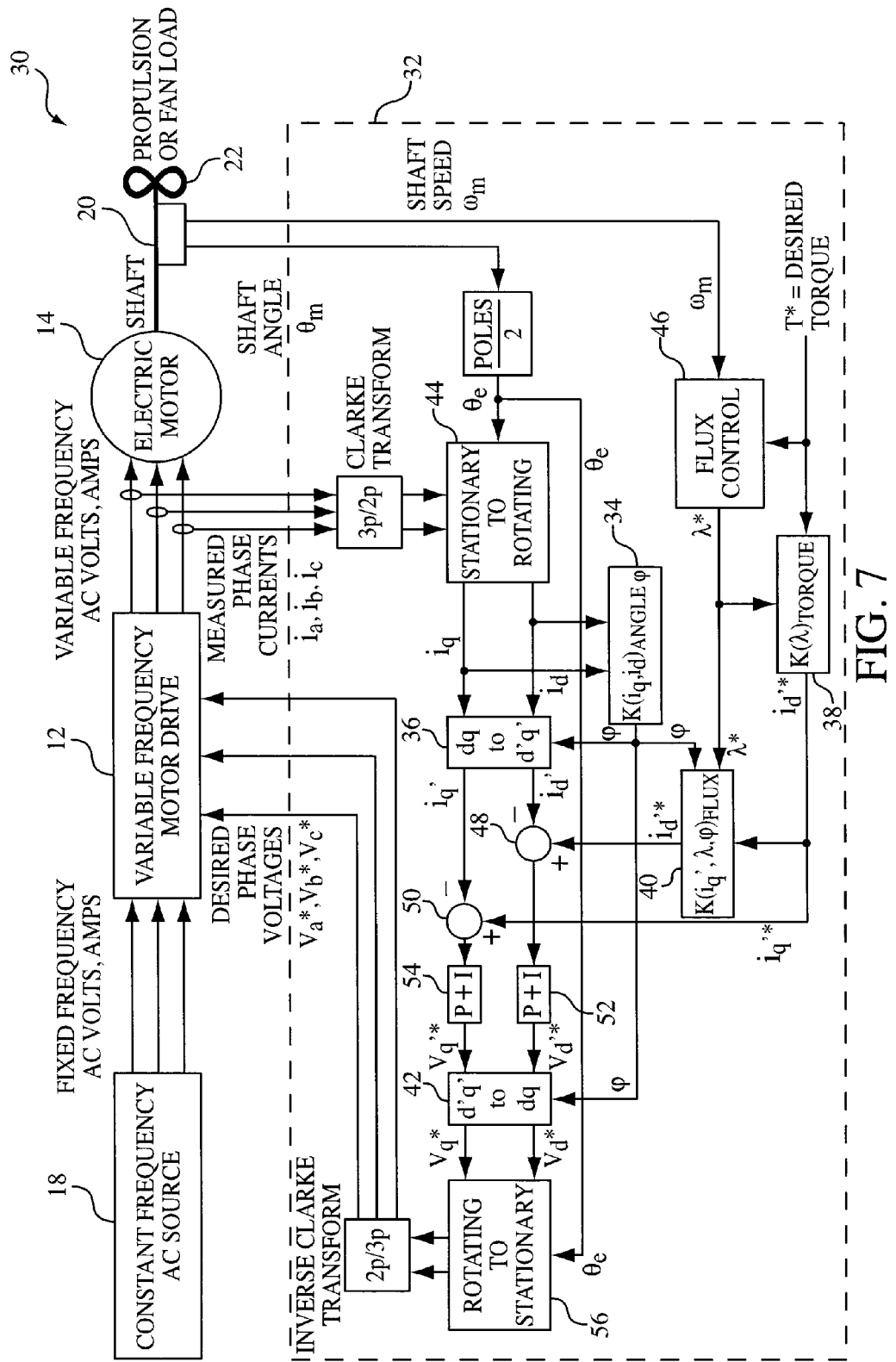
FIG. 7 illustrates various embodiments of an electric propulsion drive system.

FIG. 7 illustrates various embodiments of an electric propulsion drive system 30. The system 30 is similar to the system 10 shown in FIG. 3, but is different in that it includes an enhanced vector control system 32 in lieu of the vector control system 16 shown in FIG. 3. As shown in FIG. 7, the enhanced vector control system 32 includes a module 34 configured for determining the angle φ, a module 36 configured for defining the D'Q' reference frame and for transforming the stator d-axis and q-axis currents from the DQ reference frame to the D'Q' rotating reference frame, a module 38 configured for generating the desired q'-axis current, a module 40 configured for generating the desired d'-axis current, and a module 42 configured for transforming desired d'-axis and q'-axis voltages from the D'Q' reference frame to the DQ reference frame.

Each of the modules 34-42 may be communicably connected to one another, and each of the modules 34-42 may be implemented in hardware, firmware, software and combinations thereof. For embodiments utilizing software, the software may utilize any suitable computer language (e.g., C, C++, Java, JavaScript, Visual Basic, VBScript, Delphi) and may be embodied permanently or temporarily in any type of machine, component, physical or virtual equipment, storage medium, or propagated signal capable of delivering instructions to a device. The modules 34-42 (e.g., software application, computer program) may be stored on a computer-readable medium (e.g., disk, device, and/or propagated signal) such that when a computing device of the system 30 reads the medium, the functions described herein are performed.

According to various embodiments, the modules 34-42 may reside at a computing device of the system 30, at other devices within the system 30, or combinations thereof. For embodiments where the system 30 includes more than one computing device, the modules 34-42 may be distributed across the plurality of computing devices. According to various embodiments, the functionality of the modules 34-42 may be combined into fewer modules (e.g., a single module).

As shown in FIG. 7, the system 30 also includes a module 44 configured for transforming a two-phase set of direct currents from a stationary reference frame to the DQ reference frame, a module 46 configured for determining a desired amplitude of the motor magnetizing flux vector, first and second comparators 48, 50, first and second proportional-integral controllers 52, 54, and a module 56 configured for transforming a two-phase set of desired voltages from the first rotating reference frame to the stationary reference frame.

In general, each of the modules 44, 46, 56 may be similar to the modules 34-42 described hereinabove. Thus, the modules 44, 46, 56 may be communicably connected to any of the other modules described herein, may be implemented in hardware, firmware, software and combinations thereof, may be distributed across one or more devices, may be combined into fewer modules, etc. Additionally, the first and second comparators 48, 50 and the first and second proportional integral controllers 52, 54 may be implemented in any suitable manner, including a manner similar to those of the modules described hereinabove.

In operation, the module 34 receives the stator d-axis and q-axis current signals representative of the measured phase currents, then determines the angle φ based on equation (8) listed hereinabove. As the stator d-axis and q-axis currents are representative of the measured phase currents, the stator d-axis and q-axis currents may be referred to as the measured stator d-axis and q-axis currents. The module 36 utilizes the determined angle φ to define the D'Q' reference frame, and transforms the measured stator d-axis and q-axis currents to the D'Q' reference frame, thereby generating $i_d'$ and $i_q'$. The module 38 receives a desired torque signal (T*) and a desired flux signal (λ*), then generates a desired stator q'-axis current ($i_q'^*$) based on equation (9) listed hereinabove. The desired q'-axis current may also be referred to as the reference stator q'-axis current. According to various embodiments, the desired torque signal T* may be received from a speed controller of the system 30. The module 40 receives the determined angle φ, the desired flux signal λ*, and the desired stator q'-axis current $i_q'^*$, then generates a desired d'-axis current ($i_d'^*$) based on either equation (13) or (14) listed hereinabove. The desired d'-axis current may also be referred to as the reference stator d'-axis current.

The desired stator d'-axis current $i_d'^*$ generated by the module 40 is compared to the measured stator d'-axis current $i_d'$ generated by the module 36, and the desired stator q'-axis current $i_q'^*$ generated by the module 38 is compared to the measured stator q'-axis current $i_q'$ generated by the module 36. The results of the two comparisons represent two error signals, which are then input into respective proportional-integral controllers to generate desired stator d'-axis and q'-axis voltages ($v_d'^*$ and $v_q'^*$). The module 42 receives the desired stator d'-axis and q'-axis voltages, and transforms the desired stator d'-axis and q'-axis voltages to the DQ reference frame, thereby generating $v_d^*$ and $v_q^*$. The desired stator d-axis and q-axis voltages are then transformed from the DQ rotating reference frame to a stationary reference frame, then transformed from a two-phase set of desired voltages to a three-phase set of desired voltage signals ($v_a^*$, $v_b^*$, $v_c^*$). The variable frequency motor drive 12 receives the three-phase set of desired voltage signals, and using the three-phase set of desired voltage signals as the motor reference voltages, adjusts the three-phase variable frequency AC voltage applied to the electric motor 14 so that the desired torque and shaft speed are realized. In view of the foregoing, it will be appreciated that the decoupled torque and flux controls are established in the D'Q' reference frame.

Figure 8:
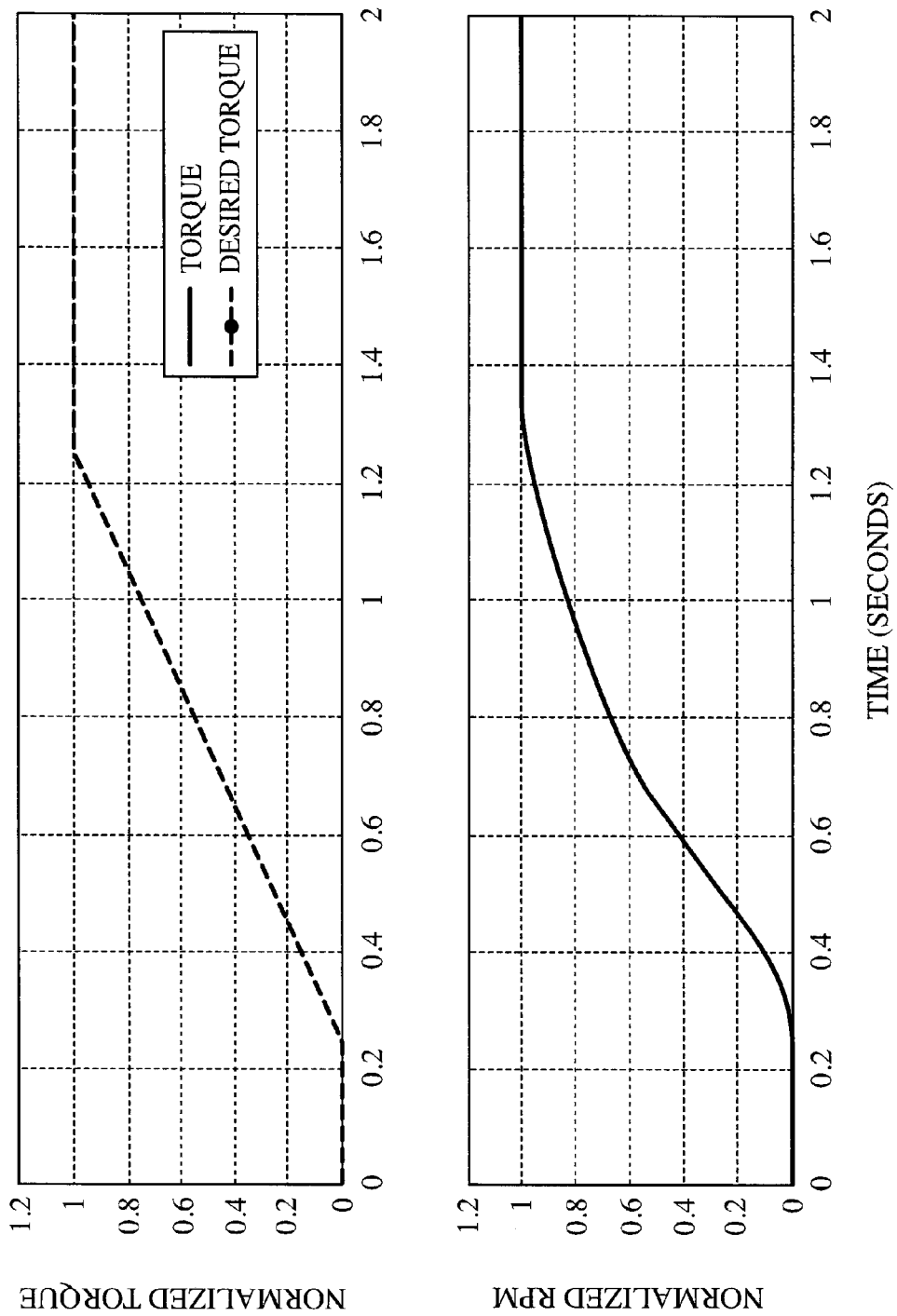
FIG. 8 illustrates simulated torque and speed results for the system of FIG. 7.

FIG. 8 illustrates simulated torque and speed results for the system 30 of FIG. 7. The propulsion load typically follows the fan law. The fan law describes the shaft load torque for a fan in air or for a propeller in water and is given by the following equation:

$$T_L = K_{fl} \omega_m^2 \quad (15)$$

where $T_L$ is the shaft load torque, $\omega_m$ is the shaft speed, and $K_{fl}$ is a proportionality constant set to make $T_L$ equal to the motor rated torque at the full rated speed. The angular acceleration of the motor is then given by the following equation:

$$\alpha_m = (T - T_L)/J \quad (16)$$

where $\alpha_m$ = the shaft angular acceleration, and J equals the rotor, shaft, and fan/propeller moment of inertia.

In FIG. 8, the desired torque is ramped from zero to full rated torque in approximately 1.0 second and is then held constant. The mechanical load on the shaft follows the fan law described above. The motor torque follows the desired torque well with an error of less than 0.5%. The motor speed reaches the full rated value to within less than 0.1%.

Figure 9:
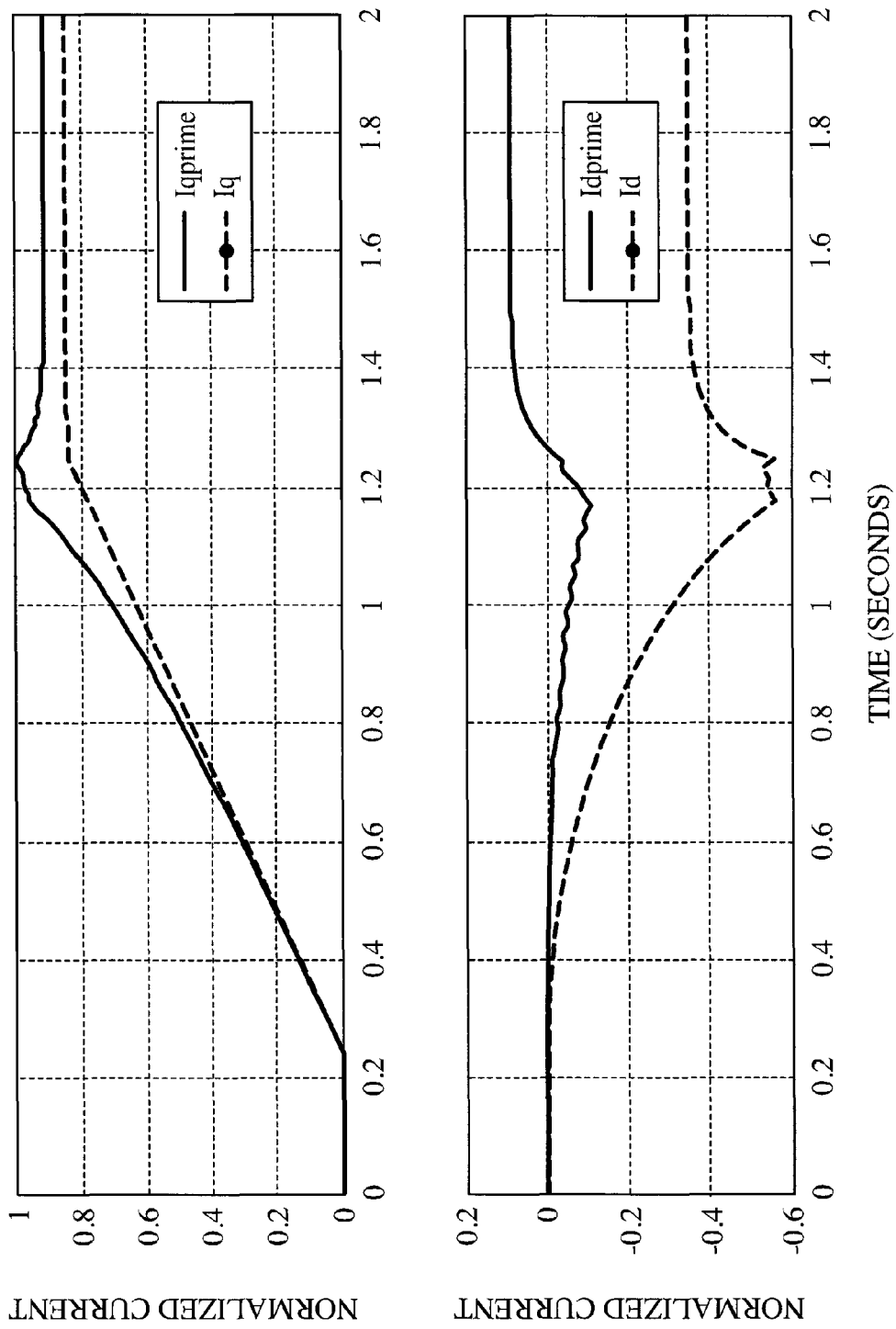
FIG. 9 illustrates simulated normalized stator currents for the system of FIG. 7.

FIG. 9 illustrates simulated normalized stator currents ($i_q'$, $i_d'$, $i_q$, and $i_d$) for the system 30 of FIG. 7. The normalized currents were generated in the simulation from the torque and speed curves in FIG. 8. The stator d'-axis current is smaller in magnitude (i.e., closer to zero) than the stator d-axis current and also crosses zero. The stator q'-axis current is larger in magnitude (i.e., farther from zero) than the stator q-axis current. The total magnitude of the current is given by either of the following equations:

$$|i_s| = \sqrt{(i_{qs})^2 + (i_{ds})^2} \quad (17)$$

or $$|i_s| = \sqrt{(i'_{qs})^2 + (i'_{ds})^2} \quad (18)$$

Figure 10:
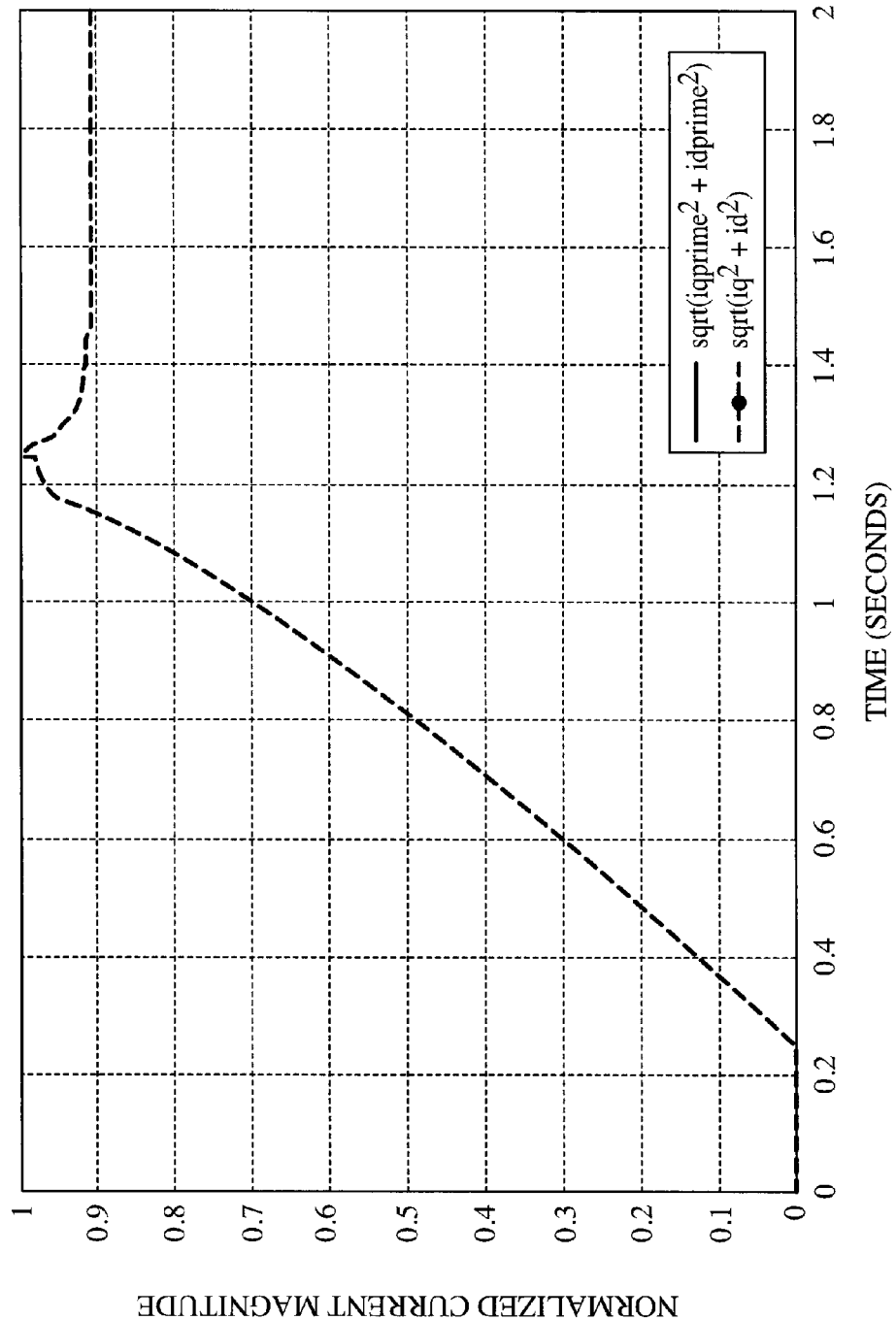
FIG. 10 illustrates magnitudes of simulated normalized stator currents for the system of FIG. 7.

FIG. 10 illustrates magnitudes of simulated normalized stator currents for the system 30 of FIG. 7. As shown in FIG. 10, the total magnitude of the stator current in the DQ reference frame is the same as the total magnitude of the stator current in the D'Q' reference frame, and the maximum current magnitude is normalized to 1.0. By comparing FIGS. 8 and 10, it will be appreciated that the maximum magnitude of stator current occurs near the transition from ramping torque to constant full rated torque.

Figure 11:
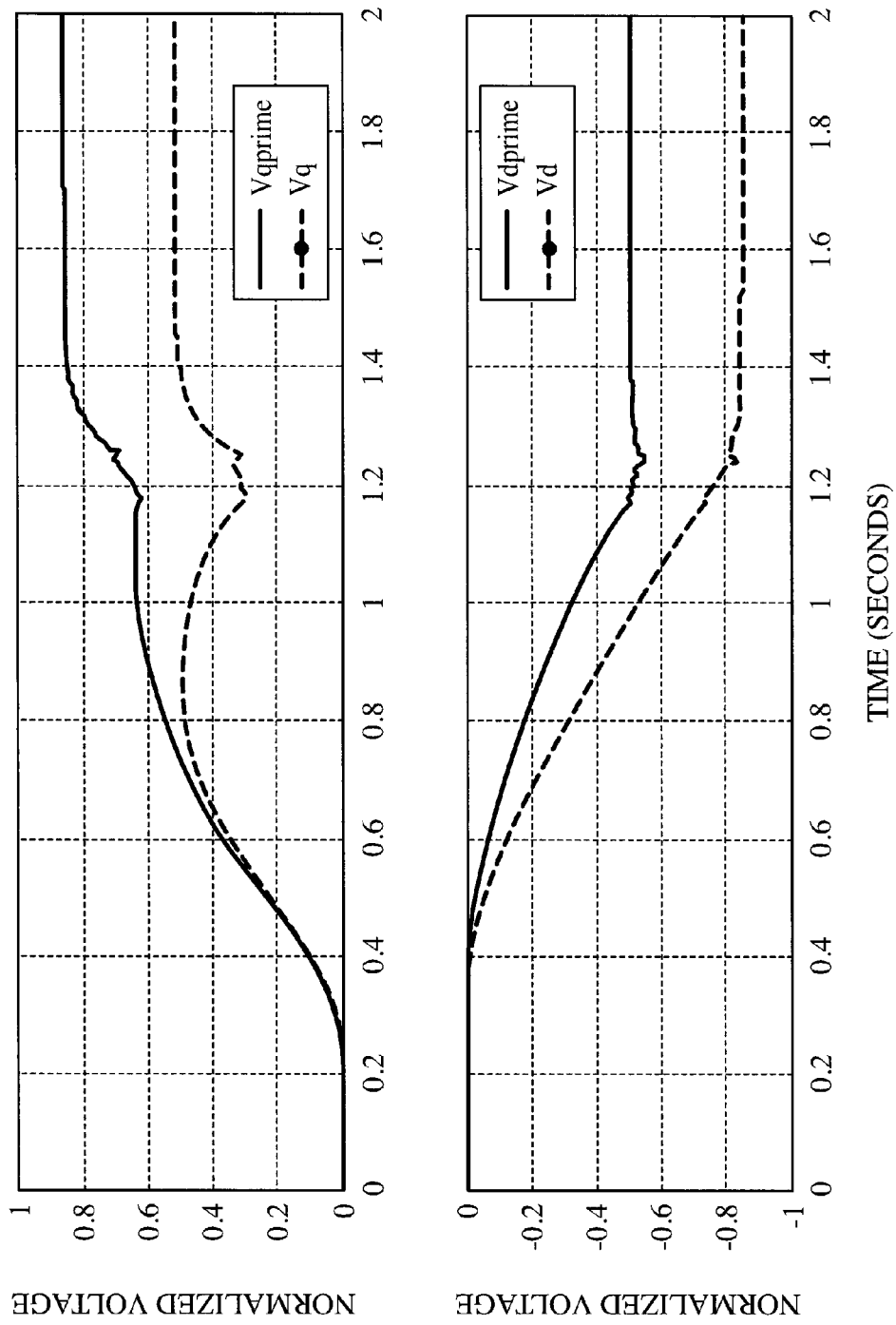
FIG. 11 illustrates simulated normalized stator voltages for the system of FIG. 7.

FIG. 11 illustrates simulated normalized stator voltages ($V_q'$, $V_d'$, $V_q$, and $V_d$) for the system 30 of FIG. 7. The normalized stator voltages were generated in the simulation from the torque and speed curves in FIG. 8. The stator q'-axis voltage is larger in magnitude (i.e., farther from zero) than the stator q-axis voltage and the stator d'-axis voltage is smaller in magnitude (i.e., closer to zero) than the stator d-axis voltage. The total magnitude of the voltage is given by either of the following equations:

$$|V_s| = \sqrt{(V_{qs})^2 + (V_{ds})^2} \quad (19)$$

or $$|V_s| = \sqrt{(V'_{qs})^2 + (V'_{ds})^2} \quad (20)$$

Figure 12:
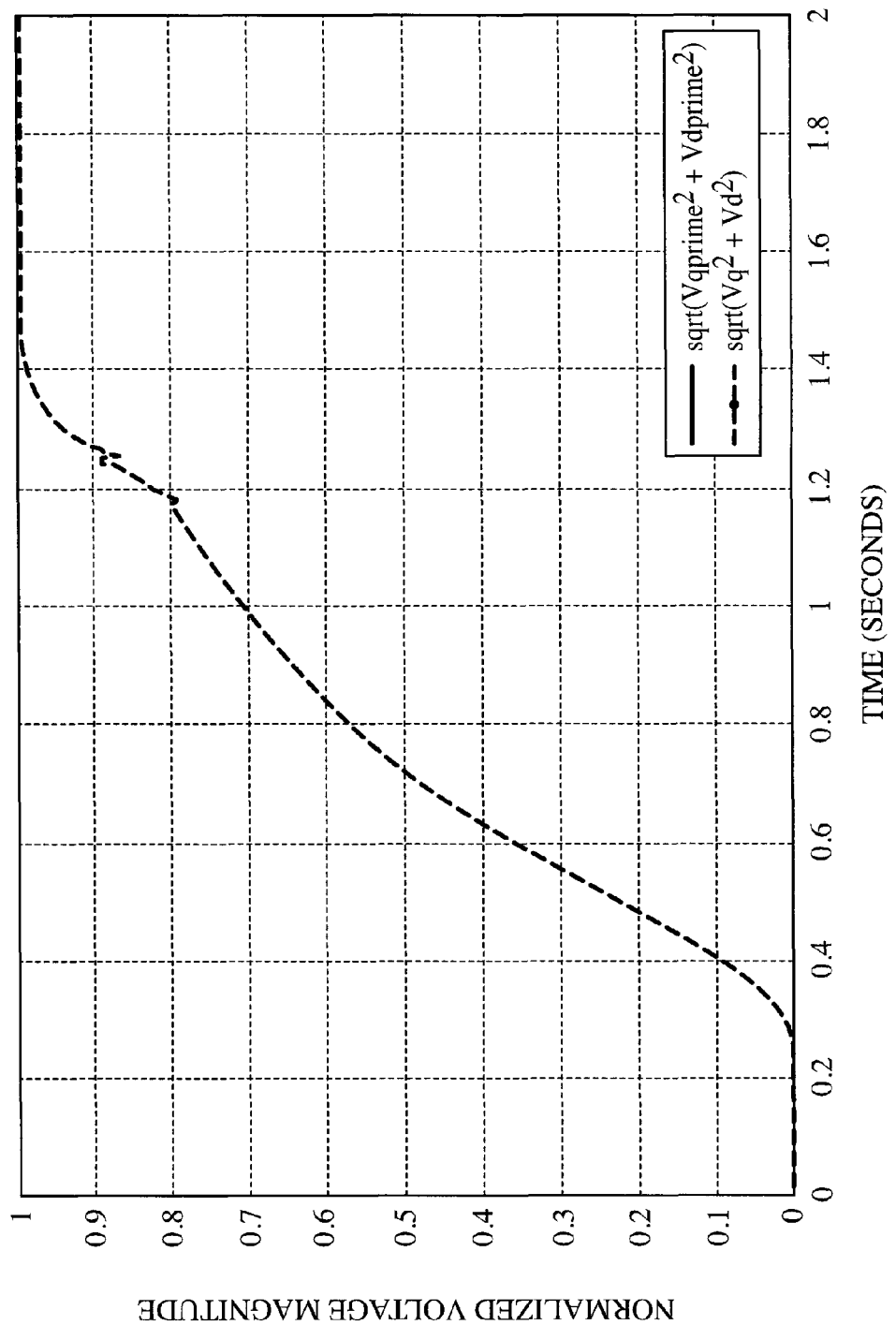
FIG. 12 illustrates magnitudes of simulated normalized stator voltages for the system of FIG. 7.

FIG. 12 illustrates magnitudes of simulated normalized stator voltages for the system 30 of FIG. 7. As shown in FIG. 12, the total magnitude of the stator voltage in the DQ reference frame is the same as the total magnitude of the stator voltage in the D'Q' reference frame, and the maximum voltage magnitude is normalized to 1.0. By comparing FIGS. 8 and 12, it will be appreciated that the maximum magnitude of stator voltage occurs at full rated speed.

Figure 13:
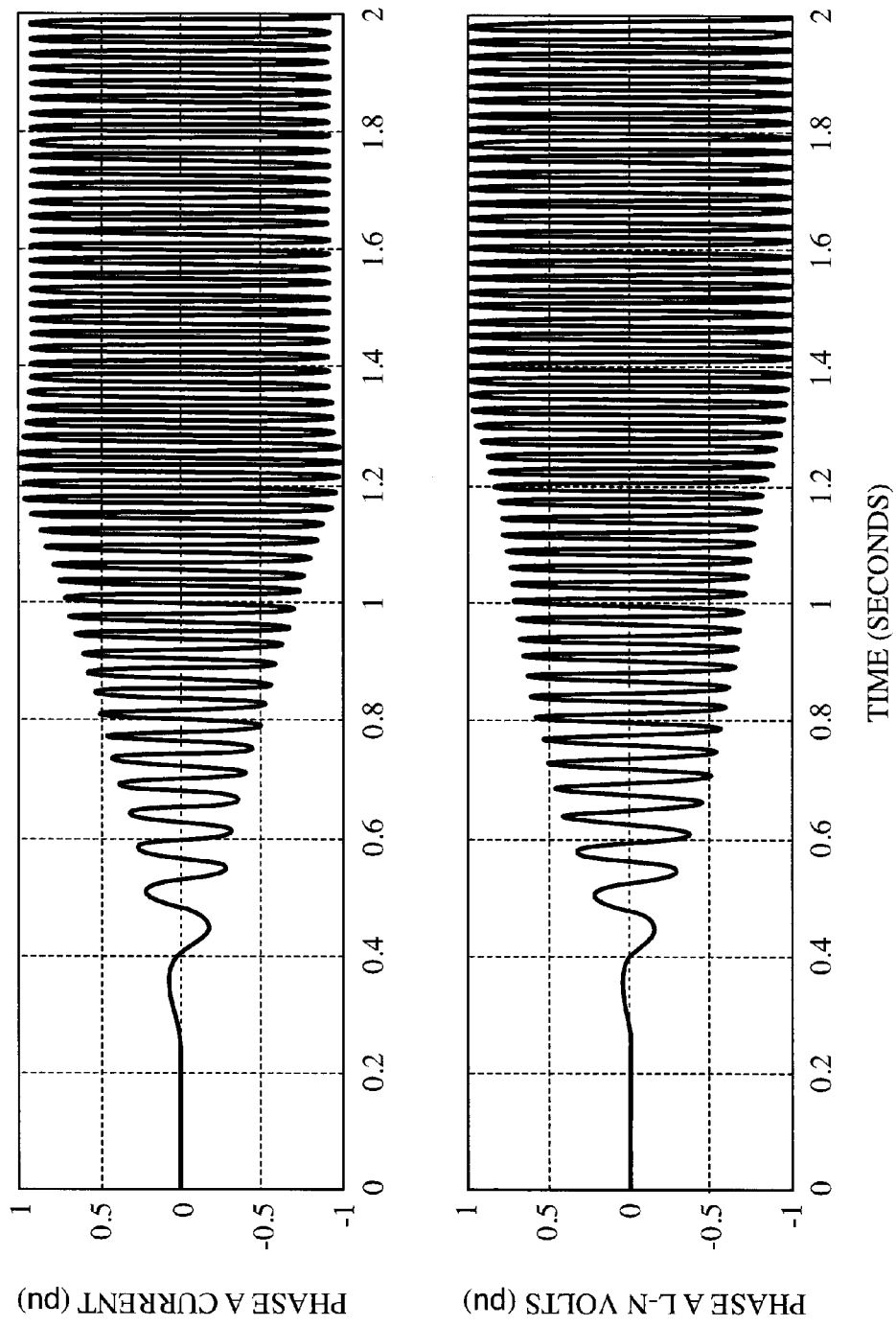
FIG. 13 illustrates a simulated normalized phase A voltage and a simulated normalized phase A current for the system of FIG. 7.

FIG. 13 illustrates a simulated normalized phase A voltage and a simulated normalized phase A current for the system 30 of FIG. 7. By comparing FIGS. 8 and 13, it will be appreciated that both the voltage and current increase in magnitude and frequency as the motor torque and speed increase from zero to full rated speed.

Although the enhanced vector control system 32 has been described in the context of a ship propulsion system, it will be appreciated that the enhanced vector control system 32 is also applicable to a variety of other applications for permanent magnet motors driven by variable frequency drives.

Nothing in the above description is meant to limit the invention to any specific materials, geometry, or orientation of elements. Many part/orientation substitutions are contemplated within the scope of the invention and will be apparent to those skilled in the art. The embodiments described herein were presented by way of example only and should not be used to limit the scope of the invention.

Although the invention has been described in terms of particular embodiments in this application, one of ordinary skill in the art, in light of the teachings herein, can generate additional embodiments and modifications without departing from the spirit of, or exceeding the scope of, the described invention. Accordingly, it is understood that the drawings and the descriptions herein are proffered only to facilitate comprehension of the invention and should not be construed to limit the scope thereof.

What is claimed is:

1. A system, comprising:
    a first module configured for determining an angle defined by:
        a first rotating reference frame having an axis aligned with a permanent magnet flux of a permanent magnet motor; and
        a vector of a motor magnetizing flux of the permanent magnet motor;
    a second module communicably connected to the first module, wherein the second module is configured for:
        defining a second rotating reference frame having an axis aligned with the vector, wherein the first and second rotating reference frames are synchronized; and
        transforming a two-phase set of direct currents from the first rotating reference frame to the second rotating reference frame;
    a third module communicably connected to the first module, wherein the third module is configured for generating a first direct current reference signal associated with the second rotating reference frame; and
    a fourth module communicably connected to the third module, wherein the fourth module is configured for generating a second direct current reference signal associated with the second rotating reference frame, wherein the first and second direct current reference signals are orthogonal.

2. The system of claim 1, further comprising a fifth module communicably connected to the first module, wherein the fifth module is configured for transforming a two-phase set of desired voltages associated with the second rotating reference frame to the first rotating reference frame.

3. The system of claim 2, further comprising:
    a first proportional-integral controller communicably connected to the fifth module; and
    a second proportional-integral controller communicably connected to the fifth module.

4. The system of claim 2, further comprising a sixth module communicably connected to the fifth module, wherein the sixth module is configured for transforming the two-phase set of desired voltages from the first rotating reference frame to a stationary reference frame.

5. The system of claim 1, further comprising a seventh module communicably connected to the first and second modules, wherein the seventh module is configured for transforming the two phase set of direct currents from a stationary reference frame to the first rotating reference frame.

6. The system of claim 1, further comprising an eighth module communicably connected to the third and fourth modules, wherein the eighth module is configured for determining a desired amplitude of the vector of the motor magnetizing flux of the permanent magnet motor.

7. The system of claim 1, further comprising:
    a first comparator communicably connected to the second and third modules; and
    a second comparator communicably connected to the second and fourth modules.

8. The system of claim 7, further comprising:
    a first proportional-integral controller communicably connected to the first comparator; and
    a second proportional-integral controller communicably connected to the second comparator.

9. The system of claim 8, further comprising a fifth module communicably connected to the first and second proportional-integral controllers, wherein the fifth module is configured for transforming a two-phase set of desired voltages associated with the second rotating reference frame to the first rotating reference frame.

10. The system of claim 9, further comprising a sixth module communicably connected to the fifth module, wherein the sixth module is configured for transforming the two-phase set of desired voltages from the first rotating reference frame to a stationary reference frame.

11. A method, implemented at least in part by a computing device, the method comprising:
    determining an angle between a first axis of a first rotating reference frame and a vector of a motor magnetizing flux of an electric motor;
    defining a second rotating reference frame based on the angle, wherein the second rotating reference frame is synchronized with the first rotating reference frame;
    transforming a two-phase set of direct currents from the first rotating reference frame to the second rotating reference frame;
    generating a first direct current reference signal associated with the second rotating reference frame for independently controlling torque applied by the electric motor; and
    generating a second direct current reference signal associated with the second rotating reference frame for controlling flux associated with the electric motor, wherein the desired first and second direct current reference signals are orthogonal in the second rotating reference frame.

12. The method of claim 11, wherein generating the first direct current reference signal comprises generating the first direct current reference signal based on a desired amplitude of the vector of the motor magnetizing flux of the electric motor.

13. The method of claim 11, wherein generating the second direct current reference signal comprises generating the second direct current reference signal based on the following:
    the angle;
    a desired amplitude of the vector of the motor magnetizing flux of the electric motor; and
    the first direct current reference signal.

14. The method of claim 11, further comprising:
    comparing the first direct current reference signal with a first one of the two-phase set of direct currents; and
    comparing the second direct current reference signal with a second one of the two-phase set of direct currents.

15. The method of claim 14, further comprising generating a two-phase set of desired voltage signals based on:
   a difference between the first direct current reference signal and the first one of the two-phase set of direct currents; and
   a difference between the second direct current reference signal and the second one of the two-phase set of direct currents.

16. The method of claim 15, further comprising transforming the two-phase set of desired voltages from the second rotating reference frame to the first rotating reference frame.

17. The method of claim 16, further comprising transforming the two-phase set of desired voltages from the first rotating reference frame to a stationary reference frame.

18. The method of claim 11, further comprising transforming the two-phase set of direct currents from a stationary reference frame to the first rotating reference frame.

19. The method of claim 11, further comprising determining the vector of the motor magnetizing flux of the electric motor based on the two-phase set of direct currents associated with the first rotating reference frame.

20. The method of claim 11, further comprising aligning the first axis of the first rotating reference frame with a permanent magnet flux of the electric motor.

* * * * *